United States Patent [19]

Rodgers

[11] Patent Number: 5,056,558
[45] Date of Patent: Oct. 15, 1991

[54] DUNNAGE AIRBAG PRESSURE CONTROLLER

[76] Inventor: Charles A. Rodgers, 6903 Quail Lake, San Antonio, Tex. 78244

[21] Appl. No.: 574,801

[22] Filed: Aug. 30, 1990

[51] Int. Cl.⁵ .................. F16K 37/00; B61D 45/00
[52] U.S. Cl. ............................ 137/552; 137/557; 137/599; 137/561 R; 410/119; 410/125
[58] Field of Search ............... 137/551, 552, 557, 599, 137/561 R, 625.28, 625.31; 410/117, 119, 124, 125; 114/75

[56] References Cited

U.S. PATENT DOCUMENTS

| | | | |
|---|---|---|---|
| 2,960,942 | 11/1960 | Pier et al. | 410/119 |
| 3,010,316 | 11/1961 | Snyder | 137/599 X |
| 3,067,699 | 12/1962 | Fredriks | 410/119 |
| 3,098,455 | 7/1963 | McElroy et al. | 410/125 |
| 3,870,072 | 3/1965 | Lindemann | 137/557 |
| 3,915,096 | 10/1975 | Salisbury | 410/125 |
| 3,948,207 | 4/1976 | St. Paul | 137/557 X |
| 3,982,533 | 9/1976 | Wiest | 137/557 X |
| 4,011,883 | 3/1977 | Petrimaux et al. | 137/599 X |
| 4,202,452 | 5/1980 | McCormick | 410/125 X |
| 4,921,009 | 5/1990 | Adam | 137/557 |

*Primary Examiner*—John Rivell
*Attorney, Agent, or Firm*—Norman B. Rainer

[57] ABSTRACT

Apparatus is provided for controlling the pressure of gas in a plurality of dunnage bags. The apparatus employs an enclosure which houses a pressure regulator valve, linear air reset controller, pressure gauge, pneumatically activated electrical switch, and three-position valve for permitting quick filling of the dunnage bags from a high pressure inlet line. A low pressure line emerges from the enclosure and communicates with the bags. When the bags are at proper inflation, the electrical switch causes a green light to be illuminated. When the bags are inadequately inflated, the electrical switch causes a red light to be illuminated.

5 Claims, 2 Drawing Sheets

DUNNAGE AIRBAG PRESSURE CONTROLLER

BACKGROUND OF THE INVENTION

This invention relates to systems and methods for controlling the pressure of gas in a plurality of inflatable dunnage members, such as in the form of "air mattresses", that are changeable with gas under pressure from a common control pipe and are interposed between cargo units in a freight-carrying conveyance and inflated, after loading of all cargo units, to fill the void between such cargo units and thus prevent shifting of, and damage to, said cargo units in event of shock impacts to the conveyance during transit.

It has heretofore been proposed to provide air-mattress-type dunnage members having a cargo-engageable area of approximately 9200 square inches and to inflate said dunnage members to a preselected pressure of between about ½ p.s.i. and 3 p.s.i., selected according to the nature of the cargo. For instance, this preselected pressure will be considerably lower for relatively light cargo units with fragile containers than for heavy cargo units such as refrigerators. If dunnage members of this area are charged with air at the preselected pressure at the loading point and no means are provided for maintaining this pressure constant, the shoring force exerted by the inflated dunnage members on the cargo units will vary 575 pounds for each ounce per square inch change in pressure in the dunnage member, will vary about 4600 pounds for each inch of mercury change in barometric pressure due either to weather changes or changes in altitude, and will vary about 1% for each 6 degrees Fahrenheit change in ambient temperature. Thus, if the air pressure in the dunnage members should increase even very slightly during transit, the cargo will be crushed, whereas if such pressure should reduce even slightly the cargo may be inadequately shored and thus be able to shift and become damaged. Such dunnage members may be utilized in cargo operations on trains, boats, trucks and aircraft.

The principal object of this invention is therefore to provide an improved control system and method for preadjusting the preselected pressure to be employed in the dunnage members and thereafter sensitively maintaining said dunnage members charged with gas at said preselected pressure irrespective of leaks and changes in ambient temperature and/or barometric pressure due to variations in weather or altitude during transit.

It is another object of the present invention to provide a control system of the aforesaid nature which can utilize pressurized air sources generally existent upon transportational conveyances.

These objects and other objects and advantages of the invention will be apparent from the following description.

SUMMARY OF THE INVENTION

The above and other beneficial objects and advantages are accomplished in accordance with the present invention by a system for controlling the pressure in a multitude of dunnage bags associated with a transportational conveyance comprising:

a) a box-like moisture-resistant enclosure having an apertured face panel, opposed rear panel, apertured side panel structure, and means for mounting said enclosure to a support surface;

b) a gas pressure regulator valve mounted within said enclosure, said regulator valve having a high pressure inlet port and reduced pressure exit port, and conduit means associated with said ports, c) an inlet attachment fitting mounted upon the exterior of said enclosure and communicating with the inlet port, d) a linear air reset controller communicating with the exit port of said regulator valve and having a downstream port coupled to conduit means which extends to an exit attachment fitting external to the enclosure, e) a pressure gauge mounted upon said face panel and adapted to indicate the pressure in the conduit means emergent from said downstream port, f) manual adjustment means operable upon said face panel and adapted to act upon said air reset controller to control the pressure at said downstream port, g) a pneumatically activated double position electrical switch communicating with said downstream port and adapted to reside in a first position at a low pressure and in a second position at a higher pressure, h) said first position causing activation of a red light on said face panel, and said second position causing activation of a green light on said face panel, the activation of said lights being achieved by said conveyance's electrical power supply, and i) a reduced pressure supply conduit communicating with said exit attachment fitting and communicating with said dunnage bags, whereby j) when the pressure in said bags is too low, said red light will be illuminated, and when the pressure in said bags is at proper level, said green light will be illuminated.

The control system may optionally be provided with a filter device to control the quality of gas entering the inlet port of said regulator. An on-off-fill switch and valves precede said inlet port. In the fill position, said valve and conduit line associated with the exit port of said regulator valve will provide a means for quickly filling the dunnage bags. An on-off electrical switch is preferably mounted upon said face panel to control the supply of electrical current to said pneumatically activated switch and said red and green lights.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 3:
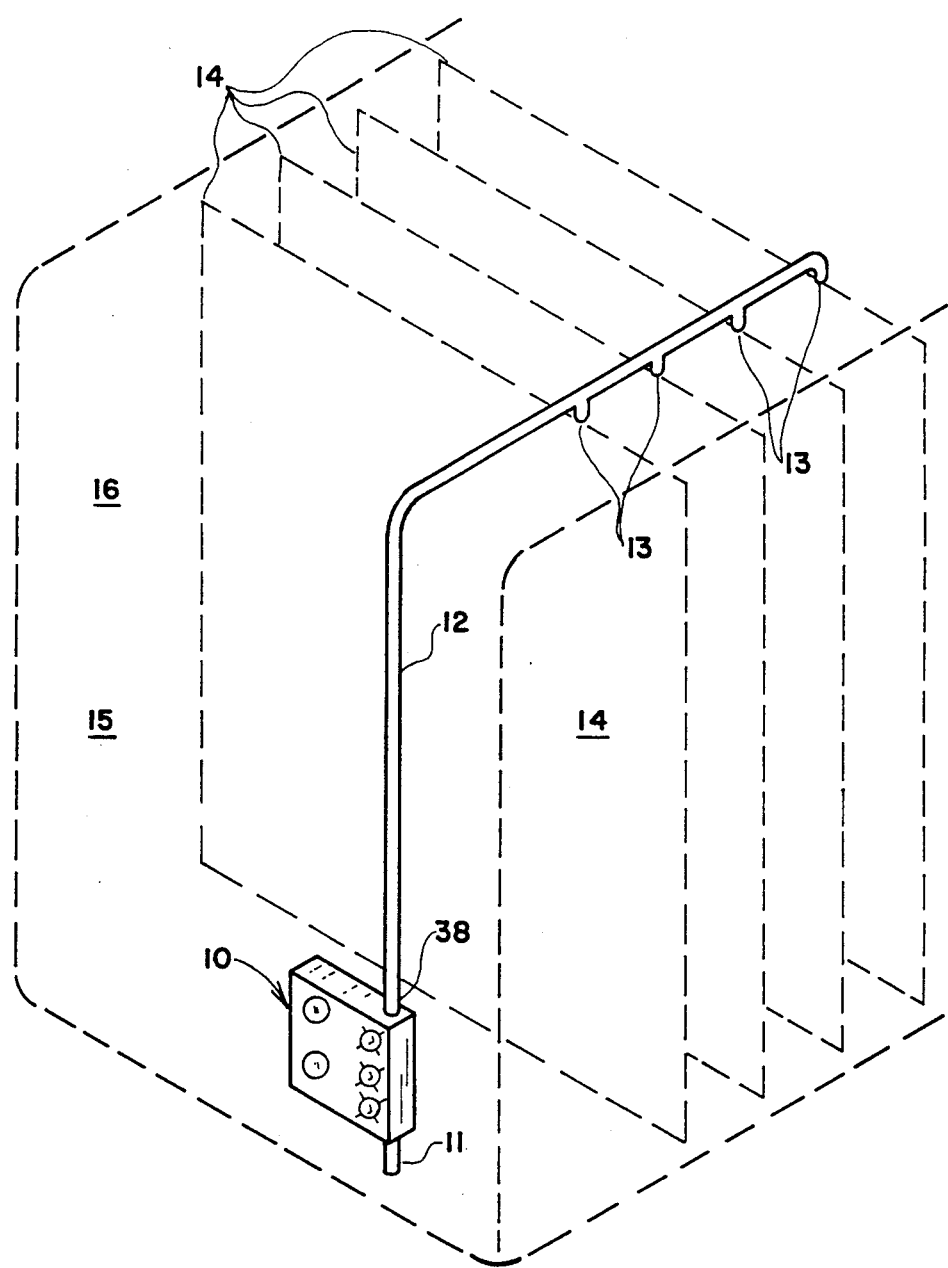
FIG. 3 is a schematic view illustrating the interrelationship of the control enclosure with the dunnage bags mounted on a conveyance.

Referring to FIG. 3, an embodiment of the control system of the present invention is shown comprised of enclosure box 10 mounted on the front wall 15 of truck trailer 16. A high pneumatic pressure input line 11 enters said enclosure box, and downstream low pressure line 12 emerges from said enclosure box and branches into service lines 13 for a multitude of dunnage bags 14.

Figure 2:
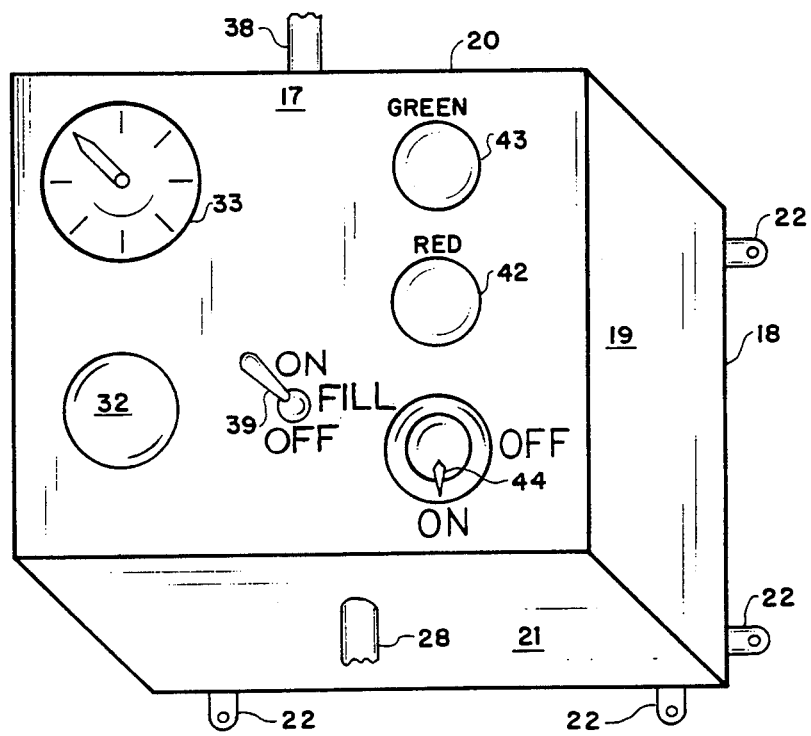
FIG. 2 is a front perspective view of the box-like enclosure.

As shown more clearly in FIG. 2, enclosure 10 is exemplified as a box-like structure comprised of flat face panel 17, flat rear panel 18, opposed side panels 19, and top and bottom panels 20 and 21, respectively. Said panels are interconnected in a manner to render the enclosure impervious to water. In alternative embodiments a cylindrical section, or an integral molded structure may replace the side, top and bottom panels, in which case said panels may instead be generically referred to as side panel structure. Mounting means in the form of apertured tabs 22 are associated with rear panel 18 for attaching said enclosure to truck trailer 16 or other transportational conveyance.

Figure 1:
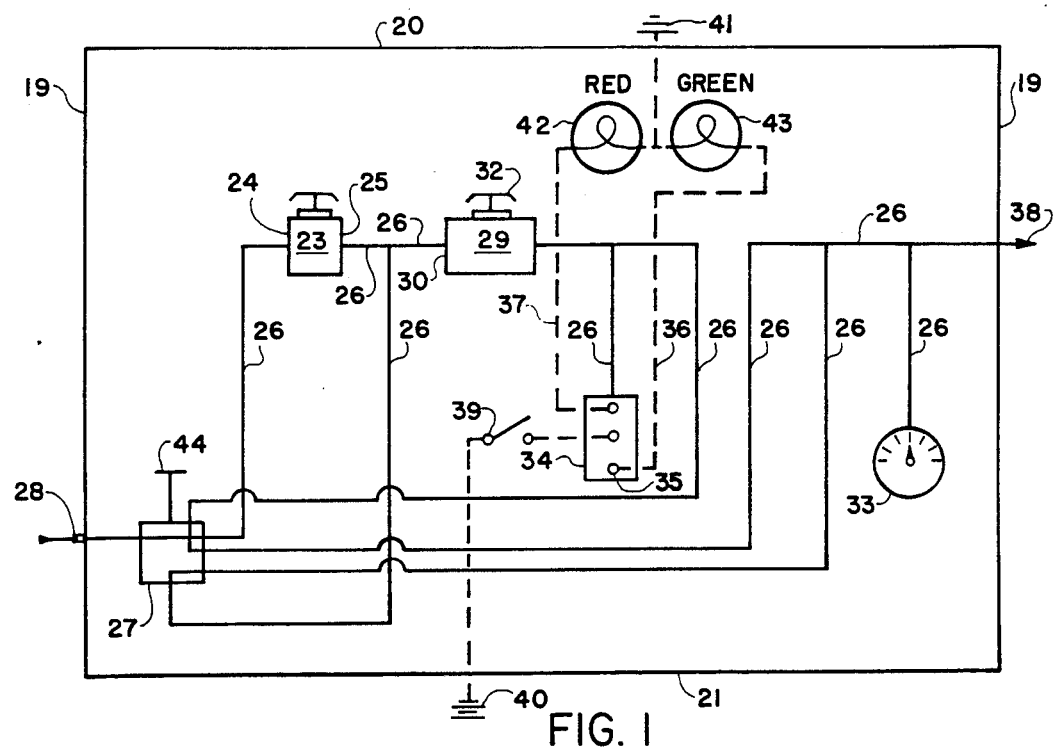
FIG. 1 is a schematic view of an embodiment of the control system of the present invention.

As shown in FIG. 1, gas pressure regulator valve 23 is mounted within said enclosure. The regulator valve is of known design wherein a spring-loaded piston is caused to control the passage of a gas. Said regulator valve has a high pressure inlet port 24 and a reduced pressure exit port 25. Conduit tubing 26 is attached to said inlet and exit ports and interconnects other components, as will be shown. Inlet port 24 communicates by way of tubing 26 with on-off-fill three-position switching valve 27 which is manipulated by knob 44 extending above face panel 17. Valve 27 communicates via tubing 26 with inlet nipple 28 attached to and penetrating an aperture in side panel 19. Nipple 28 is connected to input line 11 shown in FIG. 3, which provides air or other gas pressurized above 5 p.s.i. and up to about 150 p.s.i. The source of said pressurized air may be the compressor on a truck that operates a pneumatic brake system, or other pressurized gas systems generally utilized in transportational conveyances.

A linear air reset controller 29, having an upstream port 30 and downstream port 31, is positioned within enclosure 10 in a manner such that gas from exit port 25 is directed by conduit tubing 26 to upstream port 30. Turning movement of controller 29 regulates the gas exiting downstream port 31 to pressures between 0.5 and 2.5 p.s.i. When the controller is in the last 10% of its turning range, further turning causes very slight changes in pressure regulation. Suitable linear air reset controllers are available from the Air Dreco Company of Ridgeville, Ohio. Downstream port 31 communicates with switching valve 27 by way of conduit tubing 26. Conduit tubing 26 further communicates between valve 27 and exit fitting 38 emergent from side panel 19. Low pressure line 12 attaches to fitting 38, as shown in FIG. 3.

A manual adjustment knob 32 disposed upon face panel 17 is interactive with controller 29 in a manner to adjust and/or reset the pressure of gas delivered to downstream port 31. A pressure gauge 33 of the bourdon type disposed upon face panel 17 communicates by conduit tubing 26 with said downstream port, and thereby serves to continuously indicate the pressure of gas emergent from said port.

A pneumatically activated double position electrical switch 34 is mounted within the enclosure. Said switch communicates by tubing 26 with downstream port 31, and functions in a manner whereby electrical contacts 35 are displaced by air pressure against the urging of a restoring spring. Such displacement completes a first electrical circuit 36 while breaking a second electrical circuit 37, said electrical circuits being represented by broken lines in FIG. 1.

Both said first and second electrical circuits share an on-off switch 39, a twelve volt DC electrical supply as from a vehicle battery 40, and a ground connection 41 which connects through the framework of the vehicle to battery 40. First electrical circuit 36 contains green illumination means 43 which may be an incandescent bulb equipped with filter means. Second electrical circuit 37 contains red illumination means 42. The action of switch 34 is arranged such that, when the pressure acting upon the switch is lower than a predetermined value, red illumination means 42 is activated. When the pressure is above said predetermined value, green illumination means 43 is activated.

By virtue of the aforesaid arrangement of components, when the pressure applied to the dunnage bags is too low, red illumination means 42 will be activated. When the dunnage bags are receiving proper pressure, green illumination means 43 is activated. Such manner of function easily enables the operator to make the dunnage bags ready for operation and to ascertain when such readiness is achieved.

When knob 44 is placed in the "fill" position, switching valve 27 removes controllers 34 and 29 in the bypass position and delivers 20 p.s.i. to the air bags to cause them to fill to partial capacity. Knob 44 is then placed in the "on" position. It is necessary to bypass controllers 29 and 34 to prevent damage thereto and prevent the control point from drifting away from its desired setting.

While particular examples of the present invention have been shown and described, it is apparent that changes and modifications may be made therein without departing from the invention in its broadest aspects The aim of the appended claims, therefore, is to cover all such changes and modifications as fall within the true spirit and scope of the invention.

Having thus described my invention, what is claimed is:

1. A system for controlling the pressure in a multitude of dunnage bags associated with a transportational conveyance comprising:
   a) a box-like moisture-resistant enclosure having a face panel, opposed rear panel, side panel structure, and means for mounting said enclosure to a support surface;
   b) a gas pressure regulator valve mounted within said enclosure, said regulator valve having a high pressure inlet port and reduced pressure exit port, and conduit means associated with said ports,
   c) a high pressure inlet line which penetrates said enclosure,
   d) a linear air reset controller communicating with the exit port of said regulator valve and having a downstream port coupled to conduit means which extends to a low pressure exit attachment fitting external to the enclosure,
   e) a pressure gauge mounted upon said face panel and adapted to indicate the pressure in the conduit means emergent from said downstream port,
   f) manual adjustment means operable upon said face panel and adapted to act upon said air reset controller to control the pressure at said downstream port,
   g) a pneumatically activated double position electrical switch communicating with said downstream port and adapted to reside in a first position at a low pressure and in a second position at a higher pressure, h) said first position causing activation of a red light on said face panel, and said second position causing activation of a green light on said face panel, the activation of said lights being achieved by said conveyance's electrical power supply, i) a three position switching valve which communicates with said high pressure inlet line, said low pressure exit attachment, and said pressure regulator valve, and j) a reduced pressure supply conduit communicating with said exit attachment fitting and communicating with said dunnage bags, whereby k) when the pressure in said bags is too low, said red light will be illuminated, and when the pressure in said bags is at proper level, said green light will be illuminated.

2. The system of claim 1 further comprising an on-off electrical switch mounted upon said face panel to control the supply of electrical current to said pneumatically activated switch and said red and green lights.

3. The system of claim 1 wherein said three position valve is capable of causing quick filling of said dunnage bags with air from said high pressure inlet.

4. The system of claim 1 wherein the pressure in said high pressure inlet line is between about 5 and 150 pounds per square inch.

5. The system of claim 4 wherein the pressure at said low pressure exit attachment is between about 0.5 and 2.5 pounds per square inch.

* * * * *